United States Patent
Li et al.

(10) Patent No.: US 12,381,663 B2
(45) Date of Patent: Aug. 5, 2025

(54) METHODS AND DEVICES FOR CONFIGURING HARQ-ACK FEEDBACK

(71) Applicant: ZTE Corporation, Shenzhen (CN)

(72) Inventors: Xincai Li, Shenzhen (CN); Li Tian, Shenzhen (CN); Yajun Zhao, Shenzhen (CN); Wei Lin, Shenzhen (CN)

(73) Assignee: ZTE Corporation, Shenzhen (CN)

(*) Notice: Subject to any disclaimer, the term of this patent is extended or adjusted under 35 U.S.C. 154(b) by 376 days.

(21) Appl. No.: 17/992,732

(22) Filed: Nov. 22, 2022

(65) Prior Publication Data

US 2023/0091988 A1    Mar. 23, 2023

Related U.S. Application Data (63) Continuation of application No. PCT/CN2020/091780, filed on May 22, 2020.

(51) Int. Cl.
*H04L 1/1829* (2023.01)
*H04L 1/1812* (2023.01)
*H04L 5/00* (2006.01)

(52) U.S. Cl.
CPC .......... *H04L 1/1861* (2013.01); *H04L 5/0055* (2013.01); *H04L 1/1812* (2013.01)

(58) Field of Classification Search
CPC .... H04L 1/1812; H04L 1/1861; H04L 5/0055
See application file for complete search history.

(56) References Cited

U.S. PATENT DOCUMENTS

| 11,831,446 B2 | 11/2023 | Wang et al. |
| 2019/0045489 A1 | 2/2019 | He et al. |
| 2019/0268803 A1 | 8/2019 | He et al. |
| 2020/0228173 A1* | 7/2020 | Ye .......... H04L 5/0055 |

(Continued)

FOREIGN PATENT DOCUMENTS

| CN | 102223219 A | 10/2011 |
| CN | 107317656 A | 11/2017 |
| CN | 1105057697 A | 11/2019 |

(Continued)

OTHER PUBLICATIONS

International Search Report and Written Opinion, Feb. 7, 2021, pp. 1-6, issued in International Application No. PCT/CN2020/091787, National Intellectual Property Administration, PRC, Beijing, China.

(Continued)

*Primary Examiner* — Brian P Cox
(74) *Attorney, Agent, or Firm* — Crowell & Moring LLP (57) ABSTRACT

The present disclosure describes methods, system, and devices for configuring hybrid automatic repeat request acknowledgement (HARQ-ACK) feedback for physical downlink shared channel (PDSCH) transmission. The method includes receiving, by a user equipment (UE), a radio resource control (RRC) parameter to configure an enhanced dynamic HARQ-ACK feedback mode; and receiving, by the UE, a first downlink control information (DCI) comprising a first K. The first DCI corresponds to a first PDSCH. The method also includes receiving, by the UE, a second DCI for a second PDSCH, the second DCI comprising a second K with an applicable value; and transmitting, by the UE, an enhanced dynamic HARQ-ACK feedback according to a preset rule.

19 Claims, 10 Drawing Sheets

(56) References Cited

U.S. PATENT DOCUMENTS

| | | | | |
|---|---|---|---|---|
| 2020/0314815 | A1* | 10/2020 | Kim | H04L 1/1854 |
| 2023/0055619 | A1* | 2/2023 | Li | H04W 72/1273 |

FOREIGN PATENT DOCUMENTS

| | | | |
|---|---|---|---|
| CN | 110557972 A | 12/2019 |
| CN | 110708146 A | 1/2020 |
| CN | 111034093 A | 4/2020 |
| CN | 111130735 A | 5/2020 |
| KR | 10-2019-0097296 A | 8/2019 |
| WO | WO 2019/216620 A1 | 11/2019 |
| WO | WO 2020/001134 A1 | 1/2020 |
| WO | WO 2020/033237 A1 | 2/2020 |
| WO | WO 2020/063641 A1 | 4/2020 |

OTHER PUBLICATIONS

Extended European Search Report, Mar. 23, 2023, pp. 1-7, issued in European Patent Application No. 20896541.8, The Hague, The Netherlands.

Chinese Office Action with English translation, Apr. 26, 2024, pp. 1-13, issued in Chinese Patent Application No. 202080101237.2.

Ericsson, HARQ Enhancement, May 25-Jun. 5, 2020, pp. 1-9, R1-2003845, Agenda Item: 7.2.2.2.3, 3GPP TSG-RAN WG1 Meeting #101-e, e-Meeting.

Chinese Search Report with English translation, Sep. 26, 2024, pp. 1-6, issued in Chinese Application No. 2020801012438, State Intellectual Property Office.

Chinese Office Action with English translation, Oct. 8, 2024, pp. 1-21, issued in Chinese Application No. 202080101243.8, State Intellectual Property Office, Beijing, China.

Nokia, Nokia Shanghai Bell, Remaining issues on NR-U-HARQ scheduling and feedback, Feb. 24-28, 2020, pp. 1-12, 3GPP TSG RAN WG1 Meeting #100e, R1-2000503, e-Meeting.

Extended European Search Report, May 11, 2023, pp. 1-9, issued in European Patent Application No. 20897552.4, The Hague, The Netherlands.

CATT, Remaining details of NR CA operation, Feb. 26-Mar. 2, 2018, pp. 1-6, R1-1801740, Agenda Item: 7.1.3.4.2, 3GPP TSG RAN WG1 Meeting #92, Athens, Greece.

Lenovo, Motorola Mobility, Text proposals for HARQ enhancement for NR-U, Feb. 24-Mar. 6, 2020, pp. 1-9, R1-2000592, Agenda Item: 7.2.2.2.3, 3Gpp TSG RAN WG1 #100, E-meeting.

Nokia, Nokia Shanghai Bell, Remaining issues on NR-U HARQ scheduling and feedback, Apr. 20-30, 2020, pp. 1-15, R1-2002227, Agenda item: 7.2.2.2.3, 3GPP TSG RAN WG1 Meeting #100b, e-Meeting.

International Search Report, dated Jan. 29, 2021, pp. 1-3, issued in International Patent Application No. PCT/CN2020/091780, National Intellectual Property Administration, PRC, Beijing, China.

Written Opinion of the International Searching Authority, dated Jan. 29, 2021, pp. 1-4, issued in International Patent Application No. PCT/CN2020/091780, National Intellectual Property Administration, PRC, Beijing, China.

Sharp, HARQ enhancement for NR unlicensed operation, May 13-17, 2019, pp. 1-8, R1-1907214, Agenda Item 7.2.2.2.3 5PP TSG RAN WG1 Meeting #97;, Reno, Nevada, US.

Chinese Offfice Action with English translation, dated Sep. 11, 2024, issued in Chinese Patent Application No. 202080101237.2 (12 Pages).

Chinese Office Action with English translation, dated Mar. 28, 2025, issued in Chinese Patent Application No. 202080101243.8 (15 Pages).

* cited by examiner

400 receiving, by a user equipment (UE), a radio resource control (RRC) parameter to configure an enhanced dynamic HARQ-ACK feedback mode;
410 receiving, by the UE, a first downlink control information (DCI) comprising a first K, the first DCI corresponding to a first PDSCH;
420 receiving, by the UE, a second DCI for a second PDSCH, the second DCI comprising a second K with an applicable value;
430 transmitting, by the UE, an enhanced dynamic HARQ-ACK feedback according to a preset rule
440

METHODS AND DEVICES FOR CONFIGURING HARQ-ACK FEEDBACK

CROSS-REFERENCE TO RELATED APPLICATION

This application is a continuation application of PCT International Patent Application No. PCT/CN2020/091780, filed with the China National Intellectual Property Administration, PRC on May 22, 2020, which is herein incorporated by reference in its entirety.

TECHNICAL FIELD

The present disclosure is directed generally to wireless communications. Particularly, the present disclosure relates to methods and devices for configuring hybrid automatic repeat request acknowledgement (HARQ-ACK) feedback.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. URLLC may be supported on a licensed frequency carrier and/or an unlicensed frequency carrier. There are some issues and problems associated with transmitting feedback information, for example, when a user equipment (UE) need to configure hybrid automatic repeat request acknowledgement (HARQ-ACK) feedback, how to improve the performance of transmitting feedback information. The present disclosure may address at least some of issues associated with the existing system to improve the performance of the wireless communication.

SUMMARY

This document relates to methods, systems, and devices for wireless communication, and more specifically, for configuring hybrid automatic repeat request acknowledgement (HARQ-ACK) feedback.

In one embodiment, the present disclosure describes a method for wireless communication. The method includes configuring hybrid automatic repeat request acknowledgement (HARQ-ACK) feedback for physical downlink shared channel (PDSCH) transmission by: receiving, by a user equipment (UE), a radio resource control (RRC) parameter to configure an enhanced dynamic HARQ-ACK feedback mode; receiving, by the UE, a first downlink control information (DCI) comprising a first K, the first DCI corresponding to a first PDSCH; receiving, by the UE, a second DCI for a second PDSCH, the second DCI comprising a second K with an applicable value; and transmitting, by the UE, an enhanced dynamic HARQ-ACK feedback according to a preset rule.

In one embodiment, the present disclosure describes a method for wireless communication. The method includes configuring hybrid automatic repeat request acknowledgement (HARQ-ACK) feedback for physical downlink shared channel (PDSCH) transmission by: sending, by a radio access network (RAN) to a user equipment (UE), a radio resource control (RRC) parameter to configure an enhanced dynamic HARQ-ACK feedback mode; sending, by the RAN to the UE, a first downlink control information (DCI) comprising a first K, the first DCI corresponding to a first PDSCH; sending, by the RAN to the UE, a second DCI for a second PDSCH, the second DCI comprising a second K with an applicable value; and receiving, by the RAN from the UE, an enhanced dynamic HARQ-ACK feedback according to a preset rule.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring hybrid automatic repeat request acknowledgement (HARQ-ACK) feedback.

Next generation (NG), or 5th generation (5G), wireless communication may provide a range of capabilities from downloading with fast speeds to support real-time low-latency communication. New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. To increase bandwidth, shorten latency, and/or improve speed, the wireless communication may be carried on licensed frequency bands and/or new radio unlicensed (NR-U) frequency bands.

In the 5th generation (5G) communication system on licensed frequency carriers, a URLLC service may configure one or more subslots within one slot. Each of the one or more subslots may be configured to transmit the feedback information, so as to lower the latency in the URLLC service on licensed carriers. In the 5th generation (5G) communication system on NR-U frequency carriers, problems exist so as to increase time needed for transmitting feedback information, thus increasing latency and worsening the performance of the communication system on NR-U frequency carriers.

The present disclosure describes various embodiments addressing some of the problems discussed above.

Figure 1:
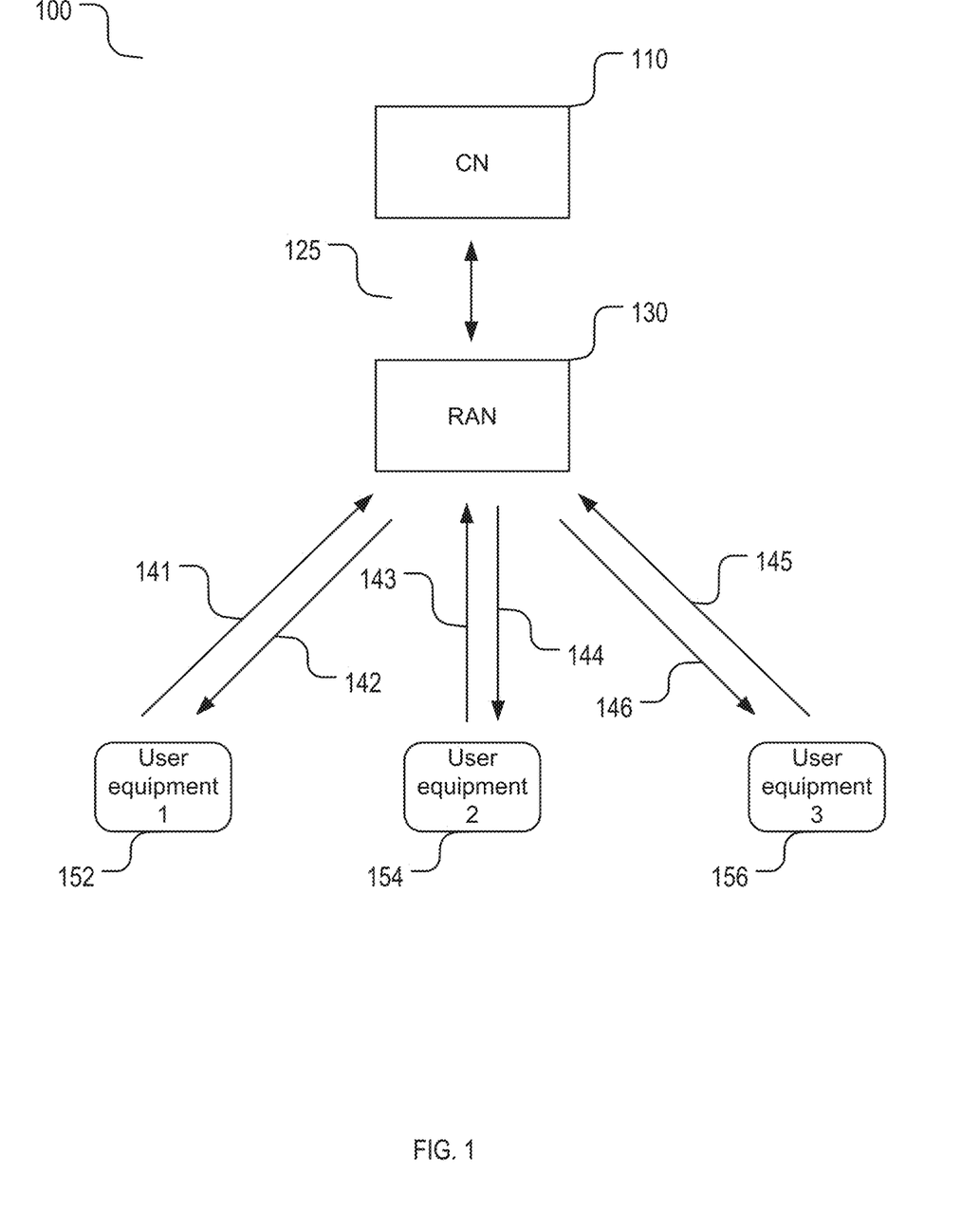
FIG. 1 shows an example of a wireless communication system.

FIG. 1 shows a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a new generation (NG) interface.

Referring to FIG. 1, a first UE 152 may wirelessly receive downlink communication 142 from the RAN 130 and wirelessly send uplink communication 141 to the RAN 130. Likewise, a second UE 154 may wirelessly receive downlink communication 144 from the RAN 130 and wirelessly send uplink communication 143 to the RAN 130; and a third UE 156 may wirelessly receive downlink communication 146 from the RAN 130 and wirelessly send uplink communication 145 to the RAN 130. For example but not limited to, a downlink communication may include a physical downlink shared channel (PDSCH) or a physical downlink control channel (PDCCH), and a uplink communication may include a physical uplink shared channel (PUSCH) or a physical uplink control channel (PUCCH). The downlink communication (142, 144, and/or 146) and/or uplink communication (141, 143, and/or 145) may be transmitted on licensed frequency carriers or NR-U frequency carriers.

When URLLC operates on licensed carriers, UE may be configured with more than one HARQ-ACK codebooks by at least one radio resource control (RRC) parameter, for example but not limited to, pdsch-HARQ-ACK-Codebook-List-r16 and UCI-OnPUSCH-List-r16. When two HARQ-ACK codebooks are configured, the parameters for these HARQ-ACK codebooks, such as candidate k1 set, the PUCCH resource set and UCI-OnPUSCH may be separately configured. The transmission of the two HARQ-ACK codebooks may be dependently in different PUCCH/PUSCH. When the transmission of these two codebooks occurs at the same slot, the HARQ-ACK codebook for lower priority (e.g., Priority index=0) may be dropped.

Using unlicensed carriers to transmit data may increase the utilization rate of available transmission resources, thus improving URLLC performance. There are some challenges associated with operating URLLC on unlicensed carriers. In low-latency wireless communications on the unlicensed carriers, a transmitted wireless message may be lost or corrupted and uncorrectable due to channel quality imperfection and fluctuation in the communication resources. As channel access should be performed before data transmission, for example, a device needs to perform a clear channel assessment (CCA) and have a successful result prior to data transmission. In some countries and regions, there are regulatory policies for the use of unlicensed spectrum. A device may perform a listening before talke (LBT) procedure (e.g., CCA) before sending data via an unlicensed carrier. For example, according to a channel access procedure, only devices with successful CCA may send data on the unlicensed carrier.

Another problem may occur when URLLC operates in unlicensed carriers. When channel access failure occurs, the gNB/UE may not send data and the receiver may not receive the data correctly. These messages, which are not received correctly, may need to be retransmitted again, thus worsening the latency and reliability. Therefore, proper designs of control mechanisms for detection and retransmission of the lost or corrupted messages may help improve the efficiency of the wireless access network, particular for accessing unlicensed shared radio frequency bands. To improve efficiency of data transmission, channel access procedure and control signaling need to be considered, and a communication system may support fast and reliability data transmission such as using unlicensed carriers for transmitting URLLC uplink HARQ-ACK feedback.

For wireless transmission in unlicensed carriers, an enhanced dynamic HARQ-ACK feedback scheme may be used to provide multiple transmission opportunity for ACK/NACK feedback. When a UE configures an enhanced dynamic feedback scheme, a downlink control information (DCI) in a certain format, for example, DCI format 1_1, may include three new bit fields. One bit field may be for a PDSCH group index, which may be 1 bit or 2 bits. One bit field may be for a new feedback indication (NFI). In one implementation, the NFI being toggled may indicate the ACK/NACK feedback information is correctly received. One bit field may be for a number of request PDSCH group. In one implementation, the HARQ-ACK codebook for two PDSCH groups may be transmitted on a same PUCCH/PUSCH if two PDSCH groups are requested at the same time. In another implementation, only two PDSCH groups may be supported in NR-U.

The present disclosure describes various embodiments for supporting URLLC transmission on unlicensed bands and carriers, and providing more transmission opportunity for HARQ-ACK feedback. The various embodiments include enhanced dynamic HARQ-ACK codebook mode supported for URLLC. The present disclosure addresses some challenges when URCCL supports enhanced dynamic HARQ-ACK codebook feedback for the unlicensed band operation, for example but not limited to, how to combine the two different characters of these two requirements, and/or how to implement the compatibility of NR-U HARQ design and URLLC enhancements.

Figure 2:
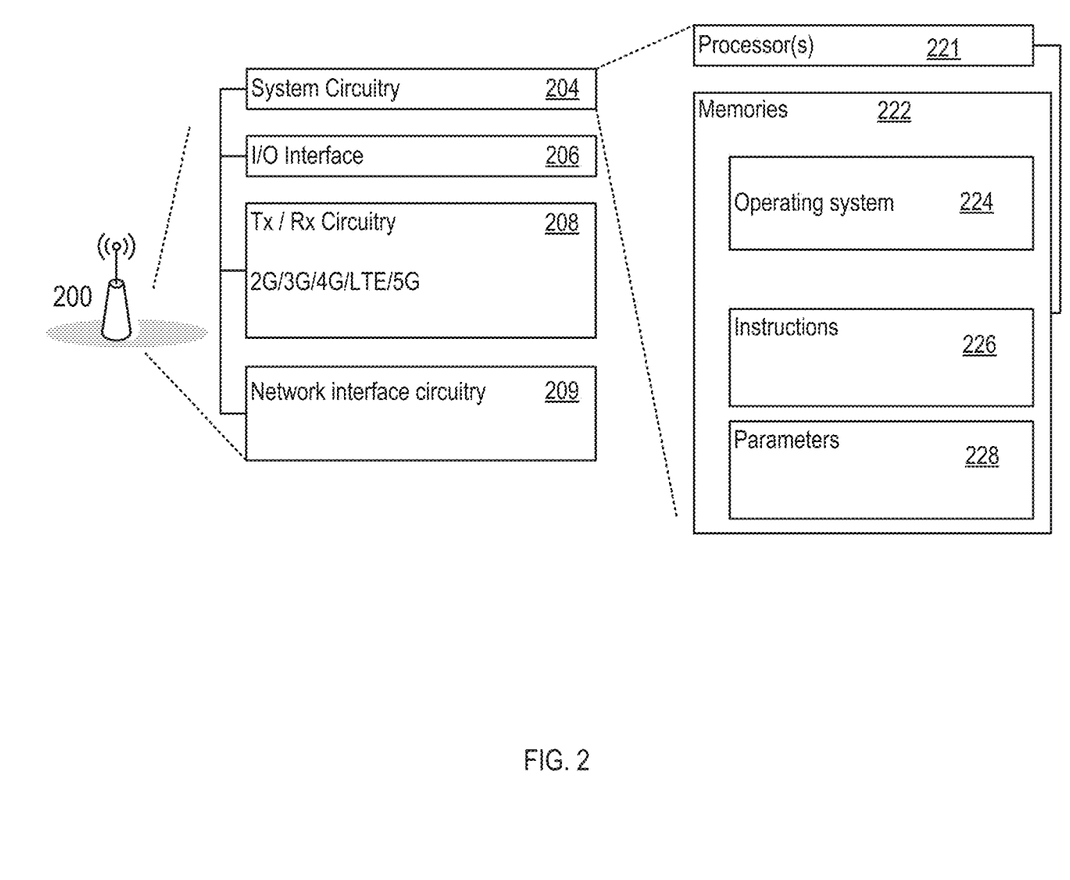
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
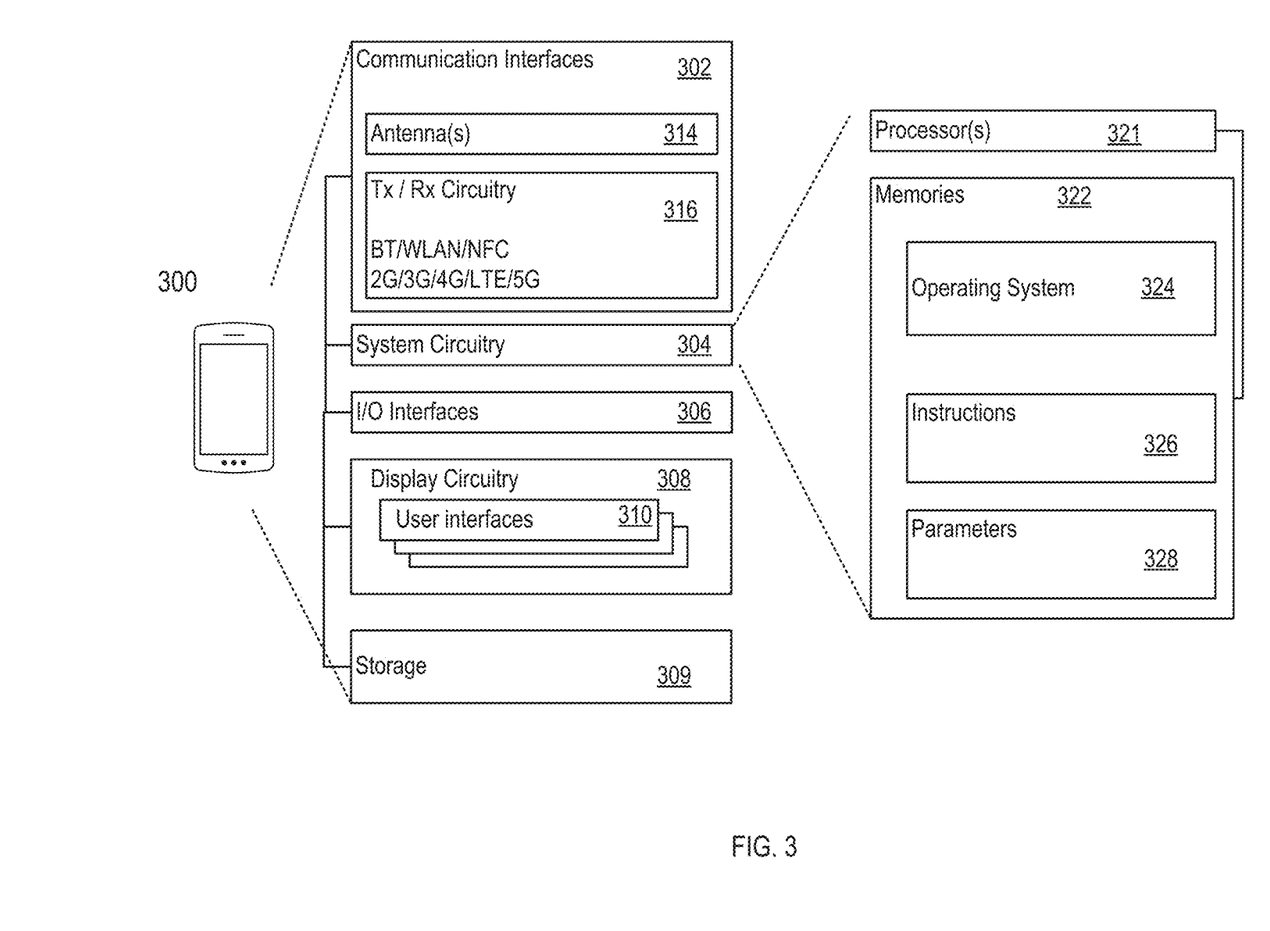
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for configuring hybrid automatic repeat request acknowledgement (HARQ-ACK) feedback for physical downlink shared channel (PDSCH) transmission, which may be implemented, partly or totally, on the wireless network base station and/or the user equipment described above in FIGS. 2 and 3.

Figure 4:
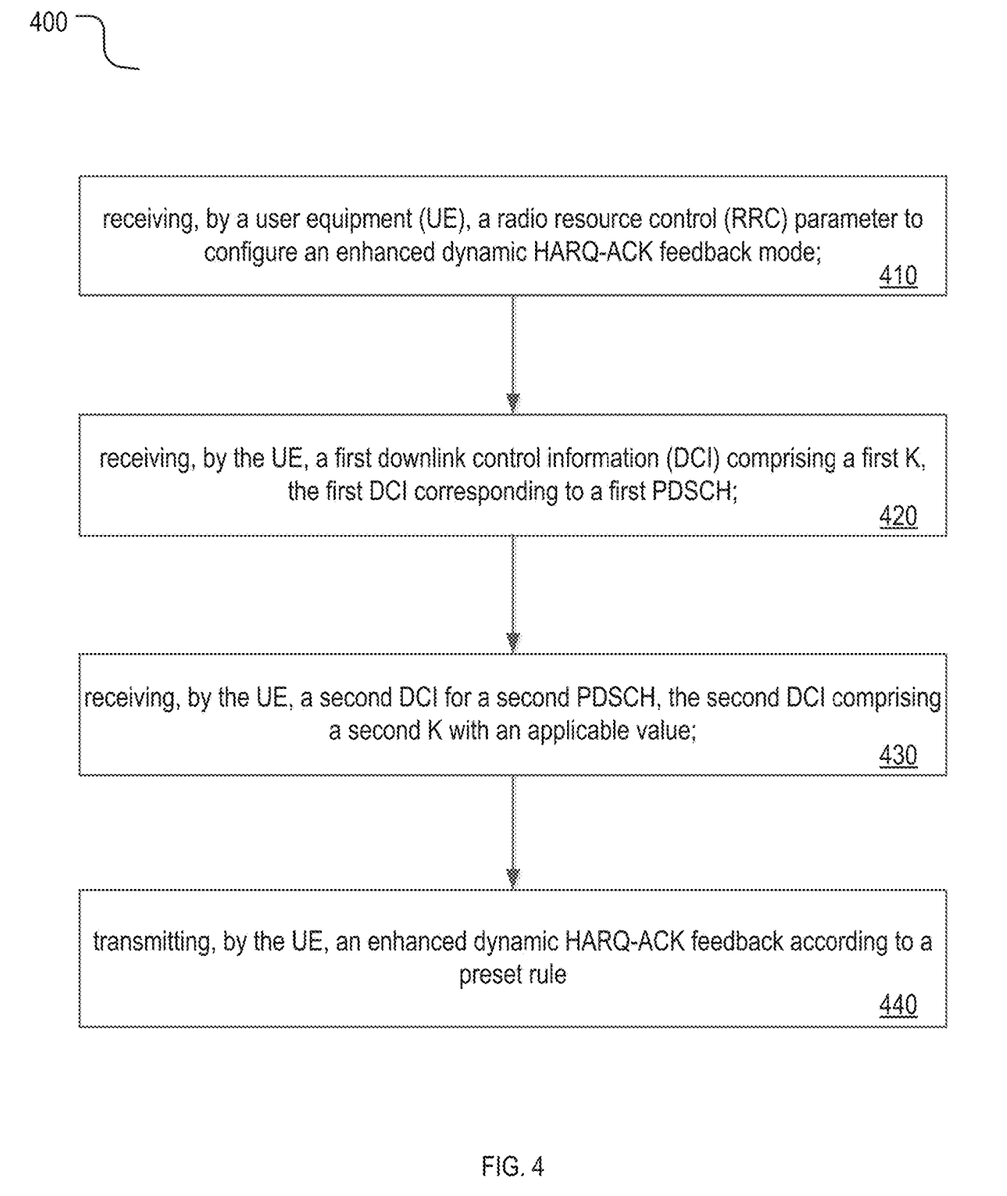
FIG. 4 shows a flow diagram of a method for wireless communication.

In one embodiment, referring to FIG. 4, a method 400 for wireless communication includes configuring hybrid automatic repeat request acknowledgement (HARQ-ACK) feedback for physical downlink shared channel (PDSCH) transmission. The method 400 may include a portion or all of the following: step 410, receiving, by a user equipment (UE), a radio resource control (RRC) parameter to configure an enhanced dynamic HARQ-ACK feedback mode; step 420, receiving, by the UE, a first downlink control information (DCI) comprising a first K, the first DCI corresponding to a first PDSCH; step 430, receiving, by the UE, a second DCI for a second PDSCH, the second DCI comprising a second K with an applicable value; and step 440, transmitting, by the UE, an enhanced dynamic HARQ-ACK feedback according to a preset rule.

Referring to step 410, a base station (e.g., RAN) transmits a RRC parameter to UE to configure the UE in an enhanced dynamic HARQ-ACK feedback mode. In one implementation, the RRC parameter may include pdsch-HARQ-ACK-Codebook with a positive value of enhancedDynamic-r16 to configure the UE in the enhanced dynamic HARQ-ACK feedback mode. The value of enhancedDynamic-r16 may be 1.

Referring to step 420, the UE receives a first DCI corresponding to a first PDSCH. The first DCI include a first K. K may be a PDSCH-to-HARQ_feedback timing indicator. In one implementation, the first K of the first DCI may have an applicable value. In another implementation, the first K may have a non-applicable value.

A K of a DCI may be known as a K1. When a K (or K1) is a non-negative value, the K (or K1) has a numerical value or an applicable value. The K (or K1) with an applicable value may indicate a scheduling timing between the PDSCH and the corresponding PUCCH so that the UE may transmit the HARQ-ACK information for the PDSCH in a slot in the PUCCH/PUSCH at the K after the corresponding PDSCH. For example, there may be K1 number of slots (or subslots) between the PUCCH and the PDSCH.

When a K (or K1) is a negative value, for example but not limited to, −1, the K (or K1) has a non-numerical value (NNK1) or a non-applicable value. The K (or K1) with a non-applicable value may indicate to a UE that the UE should store the HARQ-ACK feedback for this PDSCH.

Referring to step 430, the UE receives a second DCI corresponding to a second PDSCH. The second DCI include a second K with an applicable value. For example, the second K of the second DCI may be 2 or 3.

Referring to step 440, according to a preset rule, the UE may transmit an enhanced dynamic HARQ-ACK feedback to the base station.

In one embodiment, when a first DCI and a second DCI indicate same priority and same group, the UE combines a first HARQ-ACK feedback for the first PDSCH in an enhanced dynamic HARQ-ACK codebook with a second HARQ-ACK feedback for the second PDSCH. The UE transmits the enhanced dynamic HARQ-ACK codebook in a slot at the second K after the second PDSCH. In one implementation, the first DCI and the second DCI may schedule PDSCH with a same priority index. In another implementation, the first DCI and the second DCI may schedule PDSCH with difficult priority indexes.

DCI may have several formats, for example but not limited to, DCI format 0_1, DCI format 0_2, DCI format 1_0, DCI format 1_1, and DCI format 1_2. The present disclosure may be applicable to at least one or all of the DCI formats.

Figure 5A:
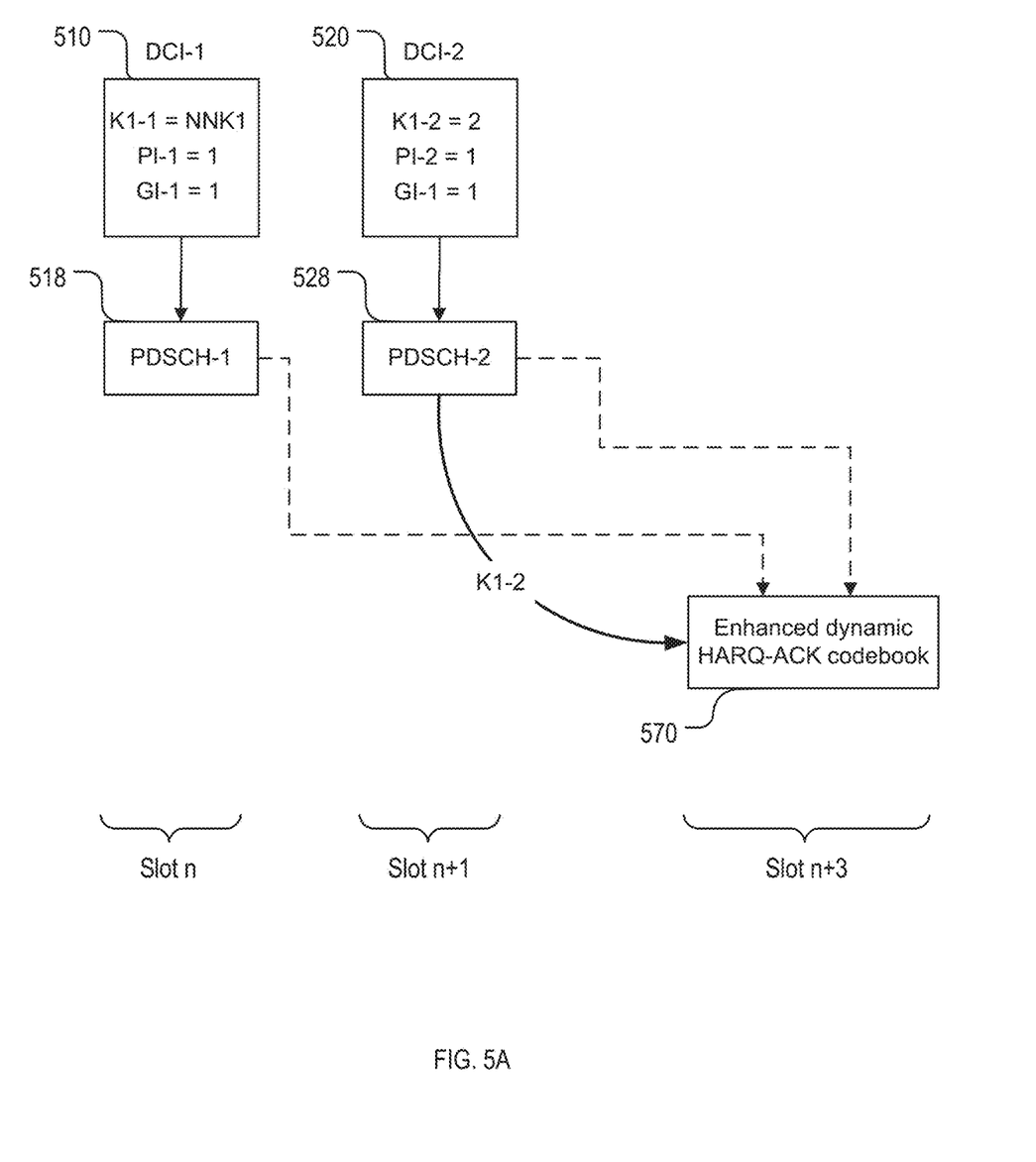
FIG. 5A shows a schematic diagram of a method for wireless communication.

For one example referring to FIG. 5A, in slot n, the UE receives a first PDSCH (PDSCH-1) 518 corresponding to a DCI-1 510 including a first K1 (K1-1)=NNK1, a first priority index (PI-1)=1, and a first group index (GI-1)=1. In slot n+1, the UE receives a second PDSCH (PDSCH-2) 528 corresponding to a second DCI (DCI-2) 520 including a second K1 (K1-2)=2, a second PI (PI-2)=1, and a second GI (GI-2)=1. Upon receiving DCI-2 including an applicable K1, same GI as DCI-1, and same PI as DCI-1, the HARQ-ACK feedback for PDSCH-1 is combined with the HARQ-ACK feedback for PDSCH-2 and is transmitted on slot n+3 according to the K1-2 value in the DCI-2 and this ACK/NACK is included in the enhanced dynamic HARQ-ACK codebook 570. In another implementation, both the DCI-1 and DCI-2 may include PI=0 or GI=0.

Figure 5B:
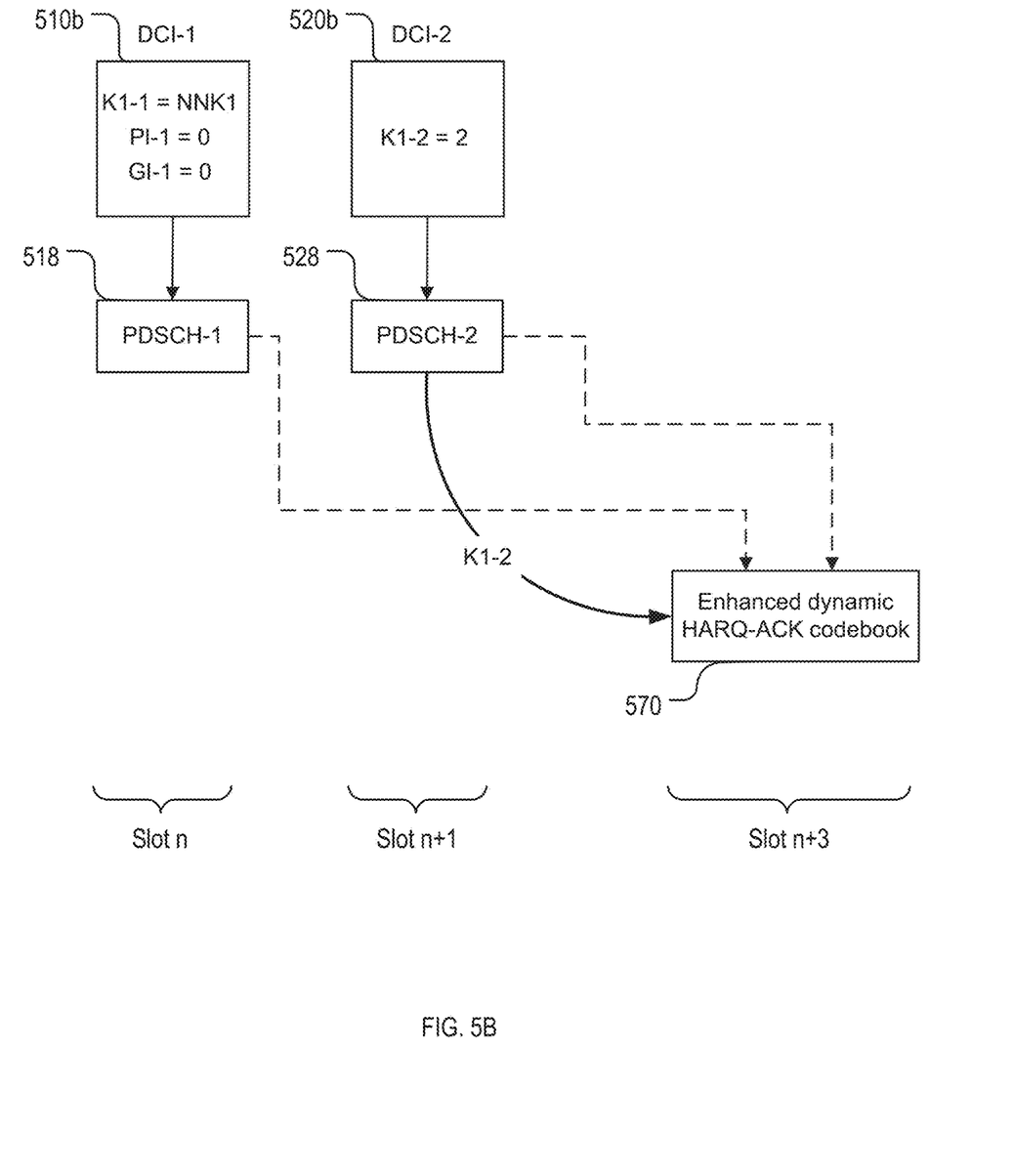
FIG. 5B shows a schematic diagram of a method for wireless communication.

In another implementation, the first DCI and/or the second DCI may not include a GI and/or PI value, and when a DCI does not include GI and/or PI, GI and/or PI may have a default value of 0. For one example referring in FIG. 5B, a first DCI (DCI-1, 510b) may include a K1-1 of a non-applicable number (NNK1), PI-1=0, and GI=0; and a second DCI (DCI-2, 520b) may include a K1-2=2 but does not include PI or GI. Although DCI-2 does not include PI or GI, the default value for PI and GI are all 0. Thus, DCI-1 and DCI-2 indicates the same priority and the same group. The UE combines the HARQ-ACK feedback for PDSCH-1 with the HARQ-ACK feedback for PDSCH-2 in an enhanced dynamic HARQ-ACK codebook 570 and transmits the enhanced dynamic HARQ-ACK codebook 570 on slot n+3 according to the K1-2 value in the DCI-2.

Figure 5C:
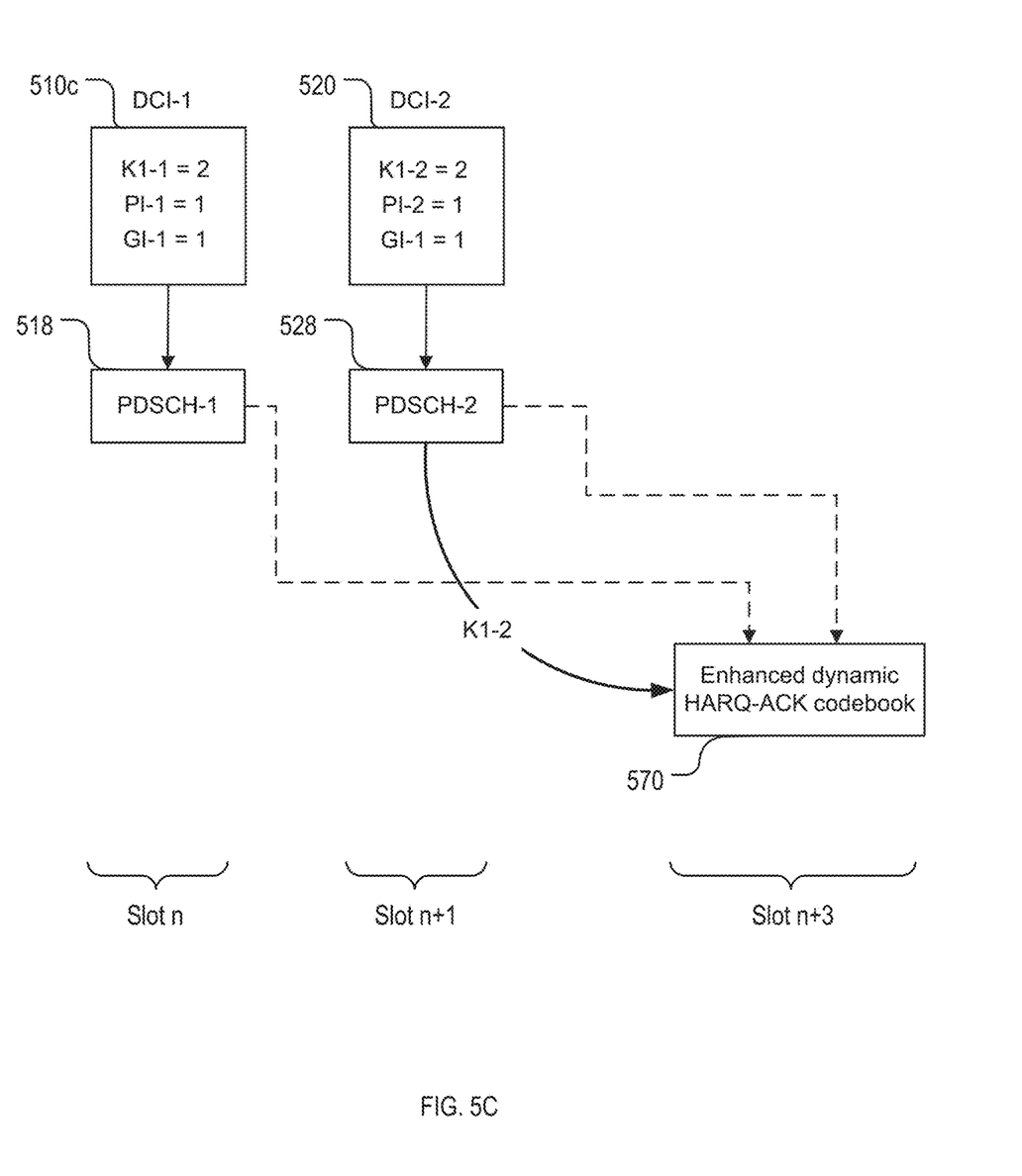
FIG. 5C shows a schematic diagram of a method for wireless communication.

In another implementation, the first K of the first DCI may also include an applicable value. For one example referring in FIG. 5C, a first DCI (DCI-1, 510c) may include a K of an applicable value (e.g., K1-1=2). Upon receiving a second DCI with an applicable value (e.g., K1-2=2) and indicating the same priority and same group as the first DCI, the UE combines the HARQ-ACK feedback for PDSCH-1 in the enhanced dynamic HARQ-ACK codebook 570 with the HARQ-ACK feedback for PDSCH-2, and transmits the enhanced dynamic HARQ-ACK codebook 570 on slot n+3 according to the K1-2 value in the DCI-2.

In another embodiment, the UE transmits an enhanced dynamic HARQ-ACK codebook for a ultra-reliable low latency communication (URLLC) in a unlicensed band configured by a specific DCI format, and the UE determines which PDSCH group does one particular PDSCH belong to when the particular PDSCH was scheduled by a DCI with the specific DCI format. For example, the DCI has a DCI format 1_2. The DCI with the specific DCI format may indicate a PDSCH group index according to a predefined rule.

For a first predefined rule, the PDSCH group index may be predefined or implied obtained, and the DCI may not include a specific bit field for the PDSCH group index. The first predefined rule may includes at least one of the following.

The DCI with the specific DCI format determines the PDSCH group index according to a priority indicator of the DCI. For example, the PDSCH group index may be determined according to the priority indicator. When the priority index value is 0, the PDSCH group is also 0; and when the priority index value is 1, the PDSCH group index is also 1.

The DCI with the specific DCI format determines the PDSCH group index as a default value. For example, all the PDSCHs scheduled by this specific DCI format (e.g., DCI format 1_2) belong to the same PDSCH group, and the PDSCH group index can be predefined to 0 (or 1).

The DCI with the specific DCI format determines the PDSCH group index according to a predefined value configured by a RRC message. For example, the RRC message may be send from the RAN to the UE to configure that the PDSCHs scheduled by DCI format 1_2 belong to group 1 (or group 0).

For a second predefined rule, a bit field for a PDSCH group index may be added to the DCI with the specific DCI format. the bit field for the PDSCH group index in the DCI rule may be determined by the following means.

Two DCIs with different priority indexes includes different PDSCH group indexes. When two DCIs have same priority index, the two DCIs may belong to different groups. For example, PDSCH of different priority may not belong to the same PDSCH group. When the priority indicator is not the same, the PDSCH group index in the two DCI may not the same, so that only scheduled PDSCH group is triggered for HARQ-ACK feedback and the number of requested PDSCH group bit field is not needed in the DCI. For another example, when the priority indicator is the same, the PDSCH group index in the two DCIs may be different so that the number of requested PDSCH group in the DCI can be 2, and the total-downlink assignment index (T-DAI) may accumulate only in the same priority indicator. In one implementation, priority index 1 may be divided to two PDSCH group and priority index 0 may have two PDSCH groups. Thus, two groups for priority index=0 and two groups for priority index=1, resulting a total of 4 PDSCH groups.

In another embodiment, the UE receives a second DCI including a new feedback indication (NFI) with a value not being toggled after the first DCI is received; and when the first DCI and the second DCI indicate same priority and same group, the UE combines a first HARQ-ACK feedback for the first PDSCH in an enhanced dynamic HARQ-ACK codebook with a second HARQ-ACK feedback for the second PDSCH. The UE may transmit the enhanced dynamic HARQ-ACK codebook in a sub-slot at the second K after the second PDSCH.

In another implementation, the second DCI includes a number of request PDSCH group with a positive value, for example, the number of request PDSCH group in the second DCI is 1. When the first DCI and the second DCI indicate same priority, the UE combines a first HARQ-ACK feedback for the first PDSCH in an enhanced dynamic HARQ-ACK codebook with a second HARQ-ACK feedback for the second PDSCH.

Figure 6A:
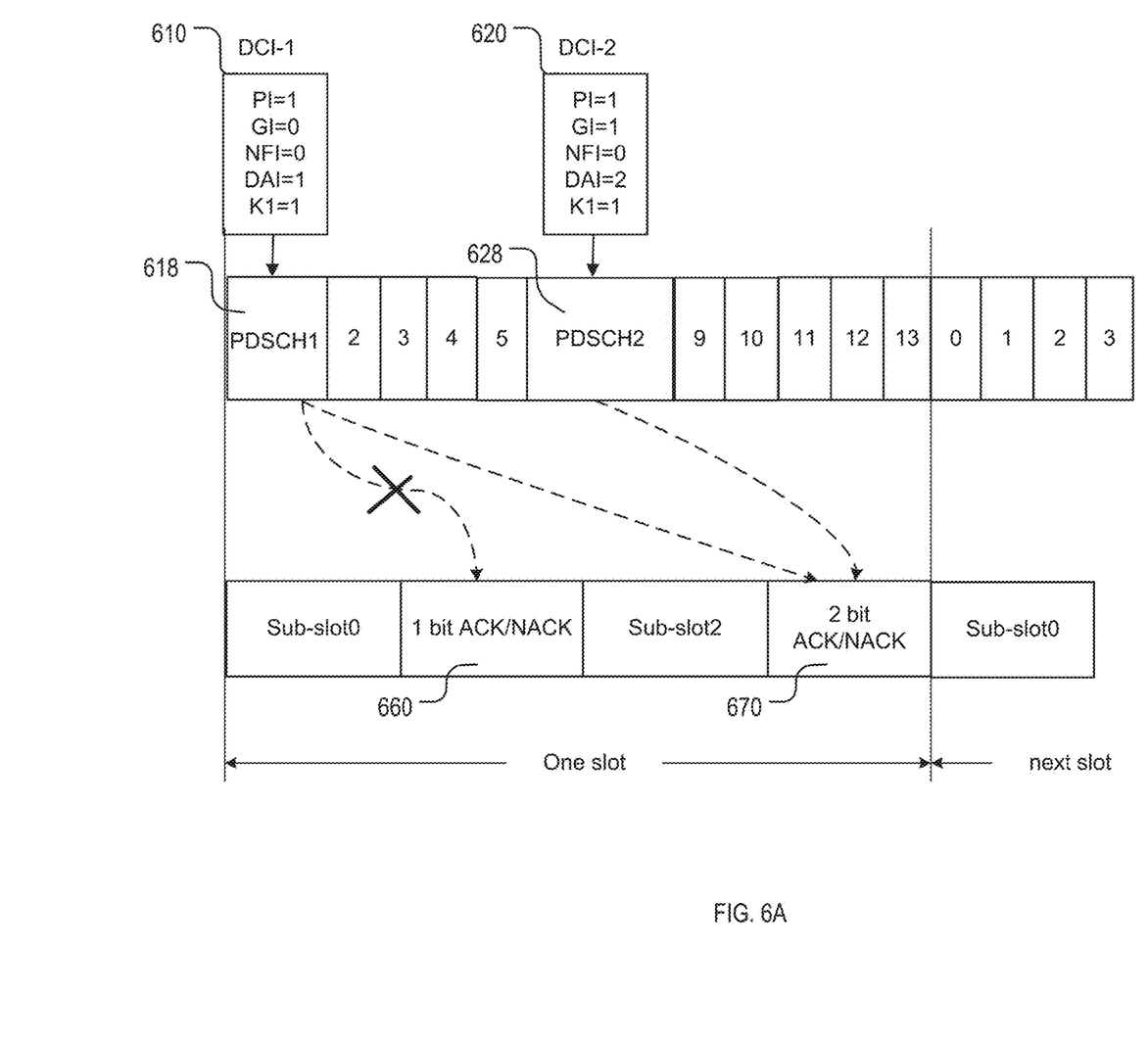
FIG. 6A shows a schematic diagram of a method for wireless communication.

For one example referring to FIG. 6A, in slot n, a UE receive a first DCI (DCI-1, 610) scheduling a first PDSCH (PDSCH1, 618). The first DCI may include a priority indicator (PI)=1, a PDSCH group index (GI)=0, a new feedback indication (NFI)=0, a downlink assignment index (DAI)=1, a K value (K1)=1. After the UE receives the first DCI, the UE performs listening before talke (LBT) procedure.

When the LBT succeeds, the UE sends the ACK/NACK information including one-bit ACK/NACK on sub-slot1 660.

When the LBT fails, the UE cannot send the ACK/NACK information on sub-slot1 660. The UE receives a second DCI (DCI-2, 620) scheduled second PDSCH (PDSCH2, 628). The second DCI includes PI=1, GI=1, NFI=0, DAI=2, and K1=1. When the base station (e.g, gNB) cannot successfully receive the HARQ-ACK feedback for the PDSCH1, the base station may indicate the number of requested PDSCH group=1 to tell the UE to feedback the HARQ-ACK information of both PDSCH group 0 and PDSCH group 1. After the UE receives the second DCI, the UE combines the ACK/NACK information for the first PDSCH and the ACK/NACK information for the second PDSCH in a ACK/NACK codebook. The ACK/NACK codebook may include 2-bit ACK/NACK information. The UE transmits the 2-bit ACK/NACK information on sub-slot3 670.

In another implementation, when in slot n, the HARQ-ACK codebook for PI=0 is dropped due to collide with the HARQ-ACK codebook for PI=1, for the next time, the base station may send another DCI and indicate the same PI=0, and the NFI is not toggled. After the UE receives the DCI, the UE may report the HARQ-ACK codebook that was dropped. For example but not limited to, the second DCI may fallback to include DCI format1_0.

Figure 6B:
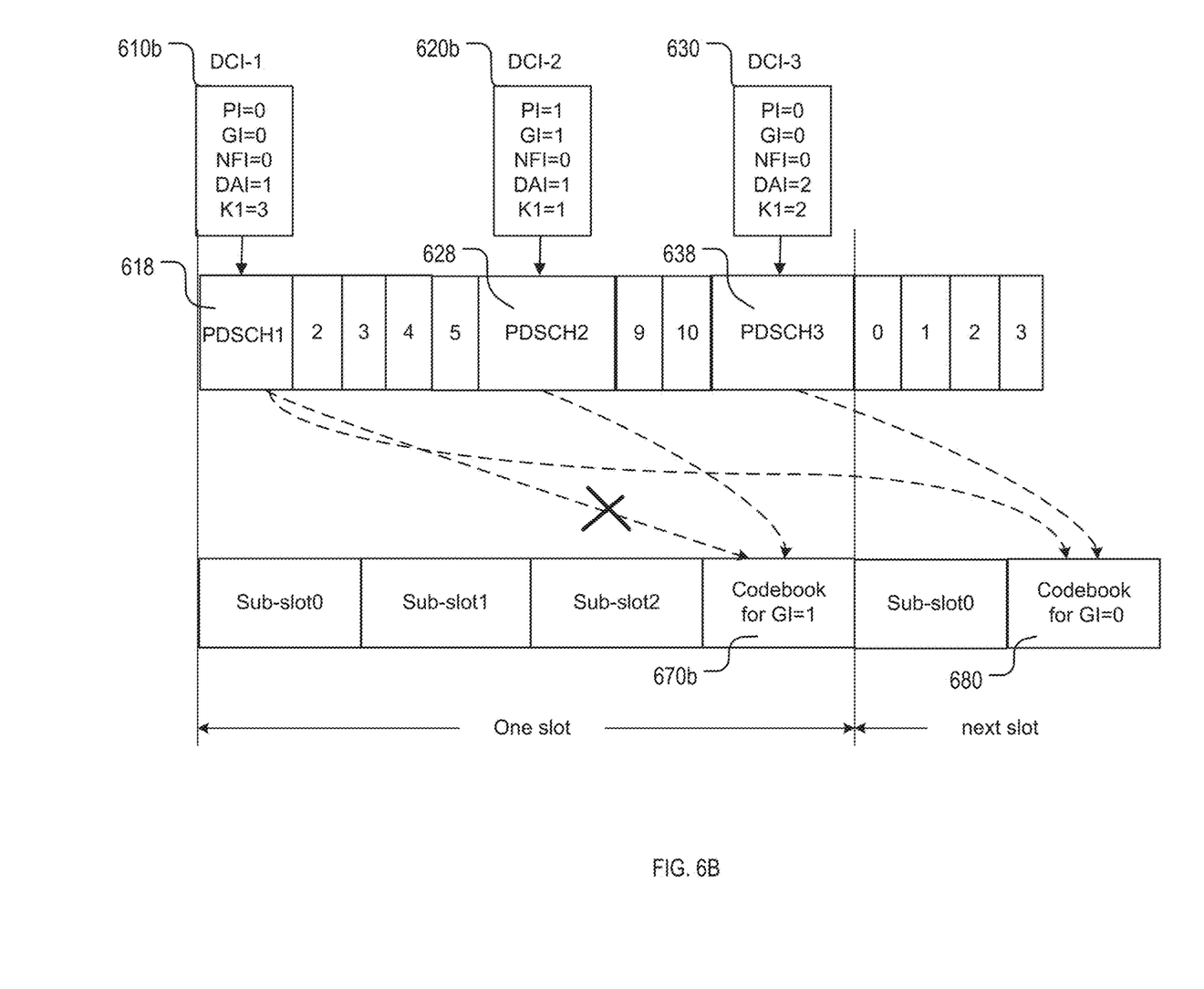
FIG. 6B shows a schematic diagram of a method for wireless communication.

For another example referring to FIG. 6B, a first PDSCH (PDSCH1, 618) is scheduled by a first DCI (DCI-1,610*b*). For example, the first DCI may have a DCI format 1_1 or DCI format 1_2. The first DCI may include PI=0, GI=0, and K1=3. A second PDSCH (PDSCH2, 628) is scheduled by a second DCI (DCI-2, 620*b*). For example, the second DCI may have a DCI format 1_1 or DCI format 1_2. The second DCI may include PI=1, GI=1, and K1=1. Upon receiving the PDSCH2 scheduled by the DCI-2, the UE may feedback the HARQ-ACK codebook for PI=1 and GI=1 (670*b*), and drop the HARQ-ACK codebook for PI=0 including the ACK/NACK information for PDSCH1. The UE may receive another PDSCH, which is a third PDSCH (PDSCH3, 638) scheduled by a third DCI (DCI-3, 630). The third DCI may have a DCI format 1_0 or DCI format 1_1. The third DCI may include PI=0, GI=0, and K1=2, and the UE may feedback the HARQ-ACK codebook with two bits ACK/NACK for PI=0 and GI=0 (680) that include the dropped HARQ-ACK information for PDSCH1.

In another embodiment, a specific bit field may be added to a specific DCI format. In one implementation, the specific bit field is a bit field for a new feedback indication (NFI), and the specific DCI format is a DCI format 1_2.

In one implementation, when the the second DCI includes a bit field for a NFI and the NFI is toggled, a counter-downlink assignment index (C-DAI) and a total-downlink assignment index (T-DAI) are reset, the UE discards a first HARQ-ACK feedback for the first PDSCH, and the UE combines a second HARQ-ACK feedback for the second PDSCH in an enhanced dynamic HARQ-ACK codebook. The C-DAI and T-DAI may not reset by PUCCh transmission occasions. The UE transmits the enhanced dynamic HARQ-ACK codebook in a slot at the second K after the second PDSCH.

In another implementation, when the NFI of the second DCI is not toggled, the C-DAI and the T-DAI are accumulated within a PDSCH group until NFI for the PDSCH group is toggled. The UE combines a first HARQ-ACK feedback for the first PDSCH in the enhanced dynamic HARQ-ACK codebook with a second HARQ-ACK feedback for the second PDSCH. The UE transmits the enhanced dynamic HARQ-ACK codebook in a slot at the second K after the second PDSCH.

In another embodiment, based on which predefined rule is satisfied, the UE determines to combine a first HARQ-ACK feedback for the first PDSCH in an enhanced dynamic HARQ-ACK codebook with a second HARQ-ACK feedback for the second PDSCH. In this embodiment, a new bit field for NFI is not added to the specific DCI format (e.g, DCI format 1_2). The predefined rule may include at least one of the following.

For one rule, the first PDSCH is in a predefined time window relative to the second PDSCH. In one implementation, after UE receives a second DCI (e.g, in DCI format 1_2), the UE reports the HARQ-ACK information for the scheduled PDSCH in a predefined time window. The duration of the window may be sub-slot level, and each sub-slot contains 4 or 7 OFDM symbols. In another implementation, the predefined time window includes at least one sub-slot; and when the first PDSCH is in the predefined time window relative to the second PDSCH, the UE combines a first HARQ-ACK feedback for the first PDSCH in the enhanced dynamic HARQ-ACK codebook with the second HARQ-ACK feedback for the second PDSCH.

For another rule, the UE determines whether a number of ACK/NACK bits in the enhanced dynamic HARQ-ACK codebook exceed a predefined threshold. In one implementation, when the number of the ACK/NACK bits in the HARQ-ACK codebook exceed a predefined value, the C-DAI and T-DAI for this PDSCH group may be reset. Otherwise, the the ACK/NACK bits in the HARQ-ACK codebook may accumulate within a PDSCH group all the time. In another implementation, when the UE determines that the number of ACK/NACK bits in the enhanced dynamic HARQ-ACK codebook exceeds the predefined threshold: a counter-downlink assignment index (C-DAI) and a total-downlink assignment index (T-DAI) are reset, the UE discards a first HARQ-ACK feedback for the first PDSCH, and the UE combines a second HARQ-ACK feedback for the second PDSCH in the enhanced dynamic HARQ-ACK codebook. When the UE determine that the number of ACK/NACK bits in the enhanced dynamic HARQ-ACK codebook does not exceed the predefined threshold: the C-DAI and the T-DAI are accumulated, and the UE combines a first HARQ-ACK feedback for the first PDSCH in the enhanced dynamic HARQ-ACK codebook with the second HARQ-ACK feedback for the second PDSCH.

For another rule, the UE determines whether a NFI in a last DCI is toggled. In one implementation, a NFI may be the same as the last DCI that the UE detects in the PDCCH monitoring occasion and indicates the same PUCCH transmission occasion. In another implementation, when the UE determine that the NFI in the last DCI is toggled: a counter-downlink assignment index (C-DAI) and a total-downlink assignment index (T-DAI) are reset, the UE discards a first HARQ-ACK feedback for the first PDSCH, and the UE combines a second HARQ-ACK feedback for the second PDSCH in the enhanced dynamic HARQ-ACK codebook. When the UE determines that the NFI in the last DCI is not toggled and the first DCI and the second DCI indicating same priority and same group: the C-DAI and the T-DAI are accumulated, and the UE combines a first HARQ-ACK feedback for the first PDSCH in the enhanced dynamic HARQ-ACK codebook with the second HARQ-ACK feedback for the second PDSCH.

Figure 7:
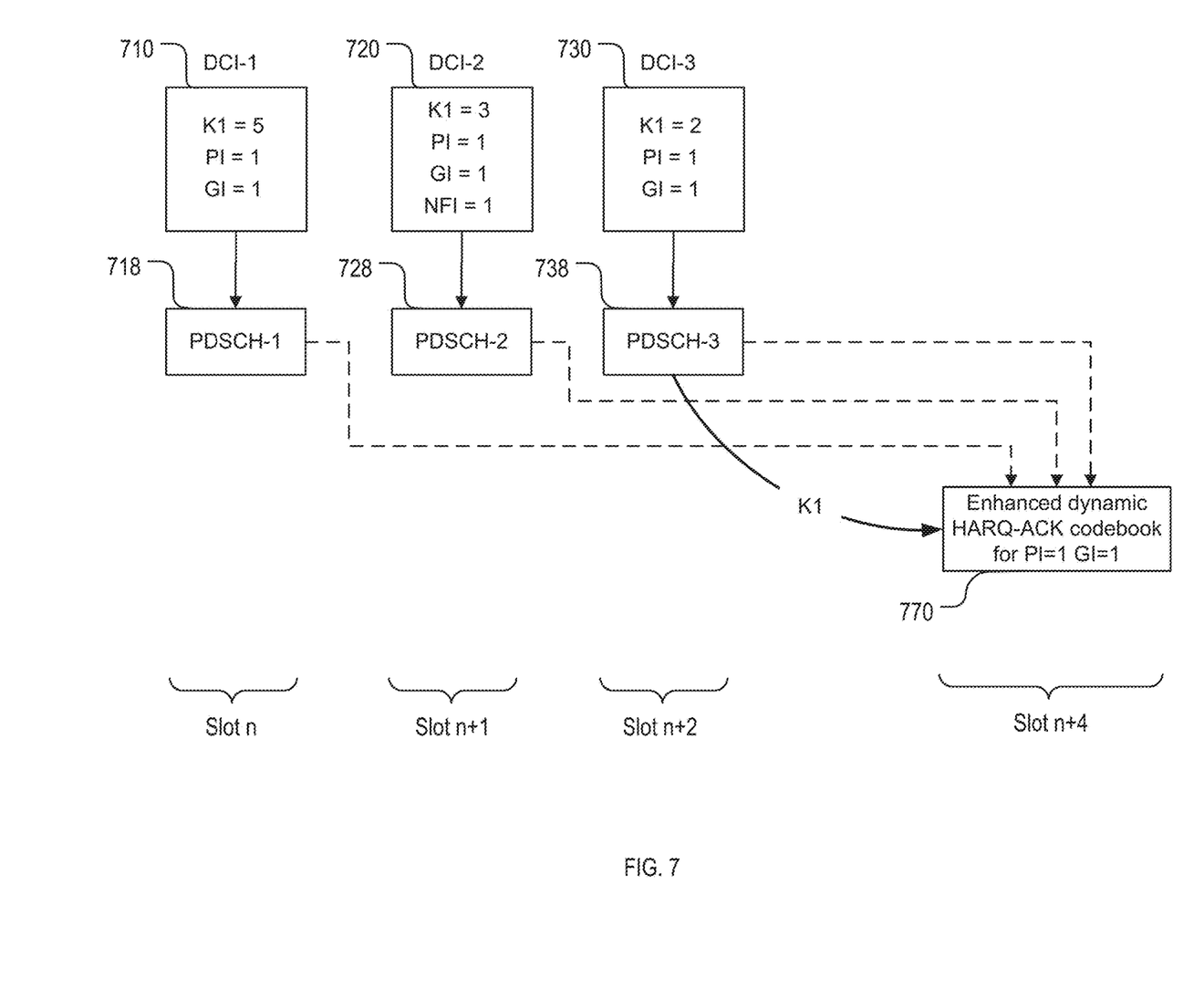
FIG. 7 shows a schematic diagram of a method for wireless communication.

For one example referring to FIG. 7, three DCIs, including DCI-1 710, DCI-2 720, and DCI-3 730, schedule three PDSCHs including PDSCH-1 718, PDSCH-2 728, and PDSCH-3 738. The UE combines HARQ-ACK feedback for these three PDSCHs in an enhanced dynamic HARQ-ACK codebook 770 for PI=1 and GI=1, and transmits the enhanced dynamic HARQ-ACK codebook 770 in the same PUCCH transmission occasion. The first DCI and the third DCI of the PUCCH transmission occasion may not include NFI, for example, being DCI format 1_2, and thus, the DCI-1 and the DCI-3 have no NFI, but have the same PI as the second DCI. The second DCI may have a DCI format 1_1. According to at least one of the rules discussed above, the NFI in the first DCI and the last DCI may be same as the second DCI, that is the NFI=1 and not toggled. The UE may feedback 3 bit HARQ-ACK information in the codebook for PI=1 and GI =1. In another implementation, the DCI-1 and the DCI-3 may have no NFI and no group index information.

In another embodiment, a DCI may include a bit field for a uplink (UL) DAI. When the DCI is not configured with UL-TotalDAI-Included-r16 and two HARQ-ACK codebooks for different priority are necessary for HARQ-ACK transmission, the UL DAI in the DCI corresponds to a HARQ-ACK codebook of higher priority. This embodiment describes a method for UE interpreting the UL DAI bit field in the UL DCI format, for example but not limited, DCI format 0_1 or DCI format 0_2.

In one implementation, when a slot indicated in the DCI scheduling PUCCH transmission occasion for HARQ-ACK feedback is the slot that scheduling PUSCH transmission, the UE may multiplex the HARQ-ACK transmission on the PUSCH. When the HARQ-ACK information is multiplexed in the PUSCH transmission, the HARQ-ACK information may be determined under at least one of the following circumstances.

For one example, when the PUSCH transmission is scheduled by a DCI format without UL-TotalDAI-Included-r16 configured except that for PDSCH group g, the DCI field with value $V_{DAI}^{UL}$ in the DCI format may be used for an enhanced dynamic HARQ-ACK codebook of the PDSCH group g or the priority index that need to reported in this position.

For another example, when the UL-TotalDAI-Included-r16 is not configured, and two HARQ-ACK codebooks of different Priority indicator are needed to transmitted on the PUSCH, which is scheduled by a DCI having DCI format 0_1 or DCI format 0_2. The DAI in the DCI may be used for indicating the HARQ-ACK codebook of higher priority.

For another example, when the UL-TotalDAI-Included-r16 is configured, these UL DAI fields may apply separately to each PDSCH group or each priority index.

The present disclosure describes methods, apparatus, and computer-readable medium for wireless communication. The present disclosure addressed the issues with configuring hybrid automatic repeat request acknowledgement (HARQ-ACK) feedback for physical downlink shared channel (PDSCH) transmission. The methods, devices, and computer-readable medium described in the present disclosure may facilitate the performance of wireless communication by configuring HARQ-ACK feedback for PDSCH transmission, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method for wireless communication, comprising:
configuring hybrid automatic repeat request acknowledgement (HARQ-ACK) feedback for physical downlink shared channel (PDSCH) transmission by:
receiving, by a user equipment (UE), a radio resource control (RRC) parameter to configure an enhanced dynamic HARQ-ACK feedback mode;
receiving, by the UE, a first downlink control information (DCI) comprising a first K, the first DCI corresponding to a first PDSCH;
receiving, by the UE, a second DCI for a second PDSCH, the second DCI comprising a second K with an applicable value and a bit field for a uplink (UL) DAI, wherein in response to the second DCI not being configured with UL-TotalDAI-Included-r16 and two HARQ-ACK codebooks for different priority being necessary for HARQ-ACK transmission, the UL DAI in the second DCI corresponds to a HARQ-ACK codebook of higher priority; and
transmitting, by the UE, an enhanced dynamic HARQ-ACK feedback according to a preset rule.

2. The method according to claim 1, wherein:
the first K comprises a non-applicable value of −1; and
the RRC parameter indicating the enhanced dynamic HARQ-ACK feedback mode comprises a pdsch-HARQ-ACK-Codebook with a positive value of enhancedDynamic-r16.

3. The method according to claim 1, wherein:
in response to the first DCI and the second DCI indicating same priority and same group, the UE combines a first HARQ-ACK feedback for the first PDSCH in an enhanced dynamic HARQ-ACK codebook with a second HARQ-ACK feedback for the second PDSCH.

4. The method according to claim 3, wherein:
the UE transmits the enhanced dynamic HARQ-ACK codebook in a slot at the second K after the second PDSCH.

5. The method according to claim 1, wherein:
the second DCI comprises a new feedback indication (NFI) with a value not being toggled after the first DCI is received; and
in response to the first DCI and the second DCI indicating same priority and same group, the UE combines a first HARQ-ACK feedback for the first PDSCH in an enhanced dynamic HARQ-ACK codebook with a second HARQ-ACK feedback for the second PDSCH.

6. The method according to claim 5, wherein:
the UE transmits the enhanced dynamic HARQ-ACK codebook in a sub-slot at the second K after the second PDSCH.

7. The method according to claim 5, wherein:
the second DCI comprises a number of request PDSCH group with a positive value; and in response to the first DCI and the second DCI indicating same priority, the UE combines a first HARQ-ACK feedback for the first PDSCH in an enhanced dynamic HARQ-ACK codebook with a second HARQ-ACK feedback for the second PDSCH.

8. The method according to claim 1, wherein:
the UE transmits an enhanced dynamic HARQ-ACK codebook for a ultra-reliable low latency communication (URLLC) in a unlicensed band configured by a specific DCI format; and
a DCI with the specific DCI format indicates a PDSCH group index according to a predefined rule.

9. The method according to claim 8, wherein:
the predefined rule comprises at least one of the following:
the DCI with the specific DCI format determines the PDSCH group index according to a priority indicator of the DCI;
the DCI with the specific DCI format determines the PDSCH group index as a default value; or
the DCI with the specific DCI format determines the PDSCH group index according to a predefined value configured by a RRC message.

10. The method according to claim 1, wherein:
the UE transmits an enhanced dynamic HARQ-ACK codebook for a ultra-reliable low latency communication (URLLC) in a unlicensed band configured by a specific DCI format; and
a DCI with the specific DCI format comprises a bit field for a PDSCH group index according to a predefined rule.

11. The method according to claim 10, wherein:
the predefined rule comprises that two DCIs with different priority indexes comprises different PDSCH group indexes.

12. The method according to claim 1, wherein:
the second DCI being a specific format comprises a bit field for a NFI;
in response to the NFI of the second DCI being toggled:
a counter-downlink assignment index (C-DAI) and a total-downlink assignment index (T-DAI) are reset,
the UE discards a first HARQ-ACK feedback for the first PDSCH, and
the UE combines a second HARQ-ACK feedback for the second PDSCH in an enhanced dynamic HARQ-ACK codebook; and
in response to the NFI of the second DCI not being toggled:
the C-DAI and the T-DAI are accumulated, and
the UE combines a first HARQ-ACK feedback for the first PDSCH in the enhanced dynamic HARQ-ACK codebook with a second HARQ-ACK feedback for the second PDSCH.

13. The method according to claim 12, wherein:
the UE transmits the enhanced dynamic HARQ-ACK codebook in a slot at the second K after the second PDSCH.

14. The method according to claim 1, wherein:
in response to satisfying a predefined rule, the UE determines to combine a first HARQ-ACK feedback for the first PDSCH in an enhanced dynamic HARQ-ACK codebook with a second HARQ-ACK feedback for the second PDSCH.

15. The method according to claim 14, wherein:
the predefined rule comprises at least one of the following:

the first PDSCH is in a predefined time window relative to the second PDSCH;

the UE determines whether a number of ACK/NACK bits in the enhanced dynamic HARQ-ACK codebook exceed a predefined threshold; or the UE determines whether a NFI in a last DCI is toggled.

16. The method according to claim 15, wherein:

the predefined time window comprises at least one sub-slot; and in response to the first PDSCH is in the predefined time window relative to the second PDSCH, the UE combines a first HARQ-ACK feedback for the first PDSCH in the enhanced dynamic HARQ-ACK codebook with the second HARQ-ACK feedback for the second PDSCH.

17. A method for wireless communication, comprising:

configuring hybrid automatic repeat request acknowledgement (HARQ-ACK) feedback for physical downlink shared channel (PDSCH) transmission by:

sending, by a radio access network (RAN) to a user equipment (UE), a radio resource control (RRC) parameter to configure an enhanced dynamic HARQ-ACK feedback mode;

sending, by the RAN to the UE, a first downlink control information (DCI) comprising a first K, the first DCI corresponding to a first PDSCH;

sending, by the RAN to the UE, a second DCI for a second PDSCH, the second DCI comprising a second K with an applicable value and a bit field for a uplink (UL) DAI, wherein in response to the second DCI not being configured with UL-TotalDAI-Included-r16 and two HARQ-ACK codebooks for different priority being necessary for HARQ-ACK transmission, the UL DAI in the second DCI corresponds to a HARQ-ACK codebook of higher priority; and receiving, by the RAN from the UE, an enhanced dynamic HARQ-ACK feedback according to a preset rule.

18. A wireless communication device comprising:

a memory storing a plurality of instructions; and a processor, in communication with the memory, configured to execute the plurality of instructions, and upon execution of the plurality of instructions, is configured to:

receive a radio resource control (RRC) parameter to configure an enhanced dynamic HARQ-ACK feedback mode;

receive a first downlink control information (DCI) comprising a first K, the first DCI corresponding to a first PDSCH;

receive a second DCI for a second PDSCH, the second DCI comprising a second K with an applicable value and a bit field for a uplink (UL) DAI, wherein in response to the second DCI not being configured with UL-TotalDAI-Included-r16 and two HARQ-ACK codebooks for different priority being necessary for HARQ-ACK transmission, the UL DAI in the second DCI corresponds to a HARQ-ACK codebook of higher priority; and transmit an enhanced dynamic HARQ-ACK feedback according to a preset rule.

19. A wireless communication node comprising:

a memory storing a plurality of instructions; and a processor, in communication with the memory, configured to execute the plurality of instructions, and upon execution of the plurality of instructions, is configured to:

sending a radio resource control (RRC) parameter to configure an enhanced dynamic HARQ-ACK feedback mode;

sending a first downlink control information (DCI) comprising a first K, the first DCI corresponding to a first PDSCH;

sending a second DCI for a second PDSCH, the second DCI comprising a second K with an applicable value and a bit field for a uplink (UL) DAI, wherein in response to the second DCI not being configured with UL-TotalDAI-Included-r16 and two HARQ-ACK codebooks for different priority being necessary for HARQ-ACK transmission, the UL DAI in the second DCI corresponds to a HARQ-ACK codebook of higher priority; and receiving an enhanced dynamic HARQ-ACK feedback according to a preset rule.

* * * * *